J. S. ETTENBOROUGH.

Tool-Holders for Slotting-Machines.

No. 5,277. Reissued Feb. 11, 1873.

Witnesses:

E. Wolff.
C. Sedgwick

Inventor:

J. S. Ettenborough
PER Munn & Co
Attorneys.

UNITED STATES PATENT OFFICE.

JAMES S. ETTENBOROUGH, OF EASTON, PENNSYLVANIA.

IMPROVEMENT IN TOOL-HOLDERS FOR SLOTTING-MACHINES.

Specification forming part of Letters Patent No. 134,198, dated December 24, 1872; reissue No. 5,277, dated February 11, 1873.

*To all whom it may concern:*

Be it known that I, JAMES S. ETTENBOROUGH, of Easton, in the county of Northampton and State of Pennsylvania, have invented a new and Improved Tool-Holder for Slotting-Machines, of which the following is a specification:

My invention consists of a relief bar or plate pivoted to the end of the shank by which the tool is attached to the reciprocating bar of the machine at right angles to the line of motion, with a tool-post similar to the tool-post of a turning-lathe for holding the tool, the relief-bar being arranged to swing and free the point of the tool from the work when it moves back, to prevent it from rubbing on the work and being worn thereby, and broken when escaping from the end of the work, the said bar being provided with a spring to throw it back into the working position before beginning to cut, and the tool-post being arranged to shift the tool sidewise for under-cutting and other purposes.

Figure 1:
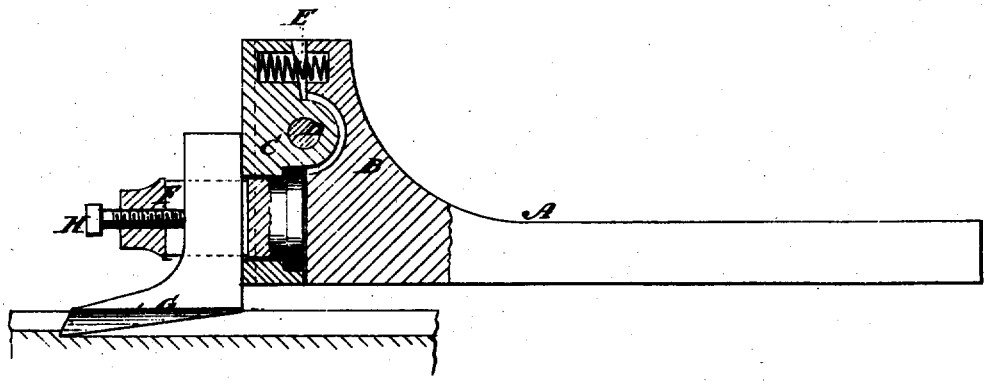
Figure 2:
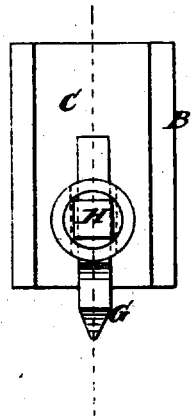

Figure 1 is a sectional elevation of my improved slotting-tool holder. Fig. 2 is a front elevation.

Similar letters of reference indicate corresponding parts.

A is a shank by which the holder is attached to the reciprocating bar of the slotting-machine. B is a head fixed on the lower end to elongate it sufficiently for the application of the relief-plate C. This head has a wide groove from front to the rear, in which the relief-plate is pivoted at D, so as to swing slightly in the plane of the direction in which the tool is moved, but it is prevented from moving laterally. Between the pivot and the front end a spring is introduced between the bottom of the groove and the relief-plate to keep the rear end of the latter against the head of the shank. Between the pivot and the rear end of the head the tool-post F, similar to those used in a turning-lathe, is mounted to hold the tool G, the shank of which is confined against the face of the relief-plate by the binding-screw H. The post is capable of turning on its axis to swing the tool sidewise to adjust it to the work for under-cutting, &c.

It will be seen that the spring will yield when the tool goes back, so that the tool will be relieved from the pressure to which it is subject when it is fastened rigidly in the ordinary way, which wears off the point very fast and breaks it when it escapes over the edge of the work at the upper side.

Having thus described my invention, what I claim as new, and desire to secure by Letters Patent, is—

A slotting-tool holder, consisting of a shank, A, with a grooved head, B, a relief-plate, C, pivoted to the slotted head, a spring, E, a tool-post, F, and a binding-screw, H, combined and arranged substantially as specified.

JAMES SPENCER ETTENBOROUGH.

Witnesses:
J. K. DAWES,
J. MOSHOUSE.